United States Patent
Kalle et al.

(10) Patent No.: US 8,250,122 B2
(45) Date of Patent: Aug. 21, 2012

(54) SYSTEMS AND METHODS FOR SIMULTANEOUS FILE TRANSFER AND COPY ACTIONS

(75) Inventors: Prasanna K. Kalle, Karnataka (IN); Venkataraghavan Lakshminarayanachar, Karnataka (IN); Prashanth K. Nageshappa, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 12/625,151

(22) Filed: Nov. 24, 2009

(65) Prior Publication Data

US 2011/0125713 A1   May 26, 2011

(51) Int. Cl.
*G06F 17/30* (2006.01)

(52) U.S. Cl. ........ 707/821; 707/822; 707/823; 707/824; 707/825; 707/826; 707/827; 707/828; 707/829; 707/830; 707/831; 709/230; 709/231; 711/112

(58) Field of Classification Search .......... 707/821–831; 709/230–231; 711/112
See application file for complete search history.

(56) References Cited

U.S. PATENT DOCUMENTS

| | | | |
|---|---|---|---|
| 5,379,398 A | | 1/1995 | Cohn et al. |
| 5,640,597 A | * | 6/1997 | Noguchi et al. ............... 710/21 |
| 5,758,076 A | * | 5/1998 | Wu et al. ........................ 709/231 |
| 5,768,527 A | * | 6/1998 | Zhu et al. ....................... 709/231 |
| 5,907,683 A | * | 5/1999 | Engelsiepen et al. ......... 709/231 |
| 6,728,736 B2 | | 4/2004 | Hostetter et al. |
| 6,904,045 B1 | * | 6/2005 | Chiussi et al. ................. 370/412 |
| 6,938,039 B1 | | 8/2005 | Bober et al. |
| 7,165,141 B2 | | 1/2007 | Cochran et al. |
| 7,254,672 B1 | * | 8/2007 | Murray et al. ................. 711/112 |
| 7,571,290 B1 | | 8/2009 | Ranade et al. |
| 2005/0188107 A1 | | 8/2005 | Piercey et al. |
| 2005/0237949 A1 | | 10/2005 | Addessi |
| 2005/0256902 A1 | * | 11/2005 | Jensen et al. .............. 707/103 R |
| 2006/0075064 A1 | | 4/2006 | Keohane et al. |
| 2006/0288008 A1 | * | 12/2006 | Bhattiprolu et al. ............. 707/9 |
| 2007/0118705 A1 | | 5/2007 | Arakawa et al. |
| 2007/0189715 A1 | * | 8/2007 | Tsai et al. ........................ 386/94 |
| 2007/0233903 A1 | | 10/2007 | Pyeon |
| 2008/0016130 A1 | | 1/2008 | Cannon et al. |
| 2008/0040503 A1 | | 2/2008 | Kleks et al. |
| 2008/0307102 A1 | * | 12/2008 | Galloway et al. ............. 709/230 |
| 2010/0191919 A1 | * | 7/2010 | Bernstein et al. ............. 711/141 |
| 2010/0281070 A1 | * | 11/2010 | Chan et al. .................... 707/803 |

* cited by examiner

*Primary Examiner* — Frantz Coby
(74) *Attorney, Agent, or Firm* — Ference & Associates LLC

(57) ABSTRACT

Embodiments of the invention broadly contemplate systems, methods, apparatuses and program storage devices providing a mechanism in which a file system and copy command (or file transfer command) allows the start of a copy operation when a file is being copied to and allow the system to continue to read the file as and when it gets updated (appended with additional data), thus permitting automated simultaneous file transfer and copy operations.

20 Claims, 3 Drawing Sheets

SYSTEMS AND METHODS FOR SIMULTANEOUS FILE TRANSFER AND COPY ACTIONS

BACKGROUND

The subject matter generally relates to file transfers and specifically to simultaneous file transfer and copy actions among a number of electronic devices.

Consider a situation where a huge file is being copied from Host A to Host B and soon Host C wants to copy the same file from Host B. In this kind of scenario, with conventional arrangements, Host C cannot start the file copy from Host B unless the copy operation from Host A to Host B is complete. Even if Host C would start the file copy from Host B before the copy operation from Host A to Host B is complete, Host C will end up getting partial file or the copy operation will not succeed due to error (for example, if the file is opened by some other process). This kind of a scenario is common for example when publishing builds, which is required by several developers (there are many other similar scenarios).

Some conventional approaches include Peer-to-Peer file sharing protocols. These peer-to-peer protocols are designed to achieve file transfer by making peers as both suppliers and consumers of resources, in contrast to the traditional client-server model (which is most commonly used) where only servers supply, and clients consume. Peer-to-peer file sharing protocols have significant difference as they do not allow for simultaneous file transfer and copy unless a peer completely downloads the file.

Another solution is to simply engage in a piecemeal process. That is, start the file copy from Host B to Host C only after the copy operation from Host A to Host B is completed. This is a manual process and the time required to get a copy of the file onto Host C is enlarged, as the copy action cannot start before the copy operation from Host A to Host B is completed.

BRIEF SUMMARY

Embodiments of the invention broadly contemplate systems, methods, apparatuses and program storage devices providing a mechanism in which a file system and copy command (or file transfer command) allows the start of a copy operation when a file is being copied to and allow the system to continue to read the file as and when it gets updated (appended with additional data). Accordingly, embodiments of the invention provide a much more efficient mechanism for file transfers and copies. Among other notable features, embodiments of the invention allow a complicated file transfer problem to be resolved in a seamless, automated manner, and moreover the time to get a copy of the file onto additional machines is reduced.

In summary, one aspect of the invention provides an apparatus comprising: one or more processors; and a computer readable storage medium having computer readable code embodied therewith and executable by the one or more processors, the computer readable program code comprising: computer readable program code configured to receive one or more file transfer requests for one or more files; computer readable program code configured to check the one or more files corresponding to the one or more file transfer requests to determine if the one or more files are opened in an append mode; computer readable program code configured to start one or more file transferring sessions for the one or more files; and computer readable program code configured to ensure that the one or more file transferring sessions remain open until the one or more files are no longer opened in the append mode.

Another aspect of the invention a method comprising: receiving one or more file transfer requests for one or more files; checking the one or more files corresponding to the one or more file transfer requests to determine if the one or more files are opened in an append mode; starting one or more file transferring sessions for the one or more files; and ensuring that the one or more file transferring sessions remain open until the one or more files are no longer opened in the append mode.

A further aspect of the invention provides a computer program product comprising: a computer readable storage medium having computer readable program code embodied therewith, the computer readable program code comprising: computer readable program code configured to receive one or more file transfer requests for one or more files; computer readable program code configured to check the one or more files corresponding to the one or more file transfer requests to determine if the one or more files are opened in an append mode; computer readable program code configured to start one or more file transferring sessions for the one or more files; and computer readable program code configured to ensure that the one or more file transferring sessions remain open until the one or more files are no longer opened in the append mode.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
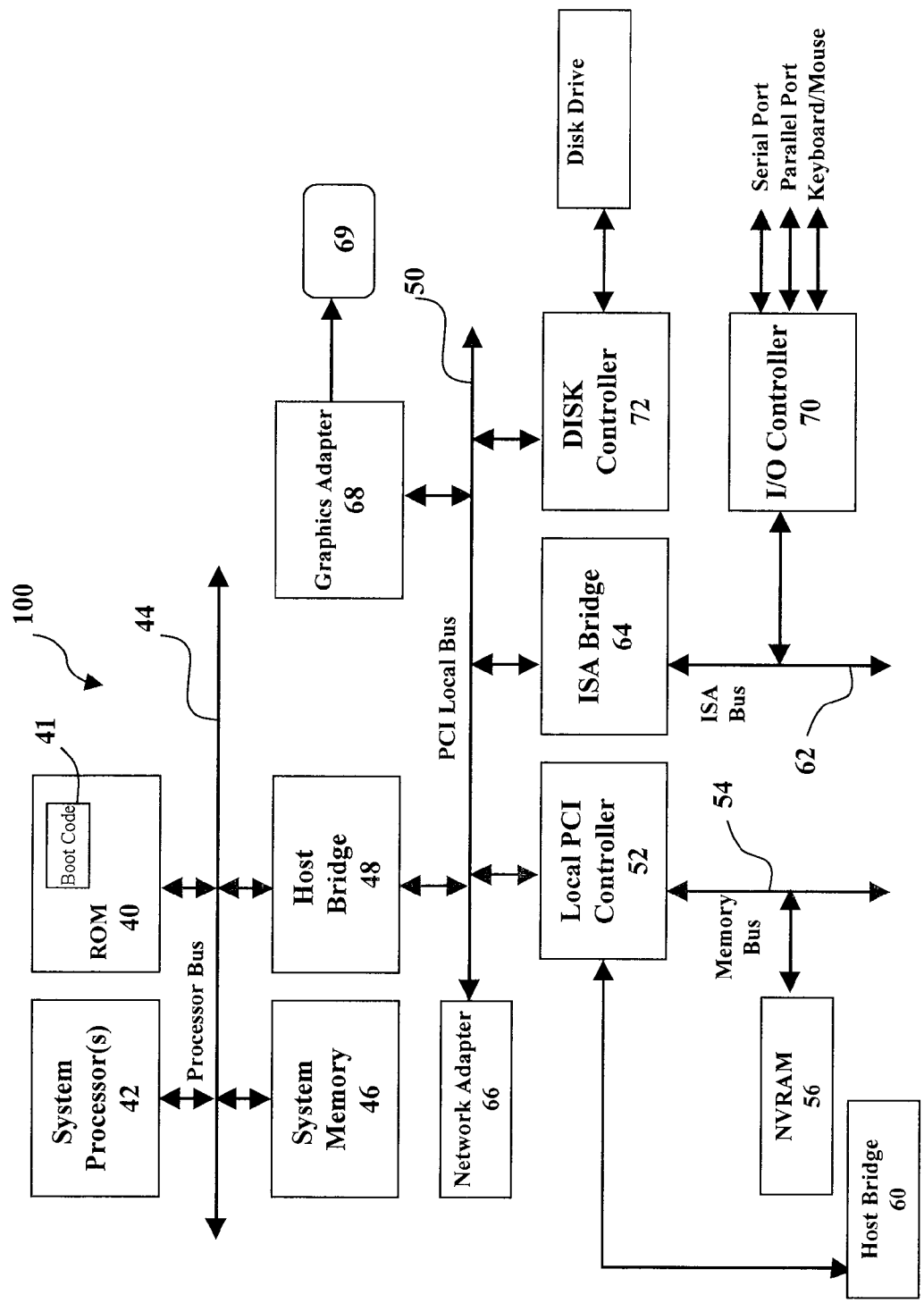
FIG. 1 illustrates a computer system according to an embodiment of the invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

According to an embodiment of the invention a mechanism in which a file system and copy command (or file transfer command) allows the start of a copy operation when a file is being copied to and allow the system to continue to read the file as and when it gets updated (appended with additional data). Accordingly, embodiments of the invention provide a much more efficient mechanism for file transfers and copies. Among other notable features, embodiments of the invention allow a complicated file transfer problem to be resolved in a seamless, automated manner, and moreover the time to get a copy of the file onto additional machines is reduced.

The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is depicted a block diagram of an illustrative embodiment of a computer system 100. The illustrative embodiment depicted in FIG. 1 may be an electronic device such as a file transfer server, a desktop computer, a workstation computer, a laptop computer, a mobile computing device, and the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

Figure 2:
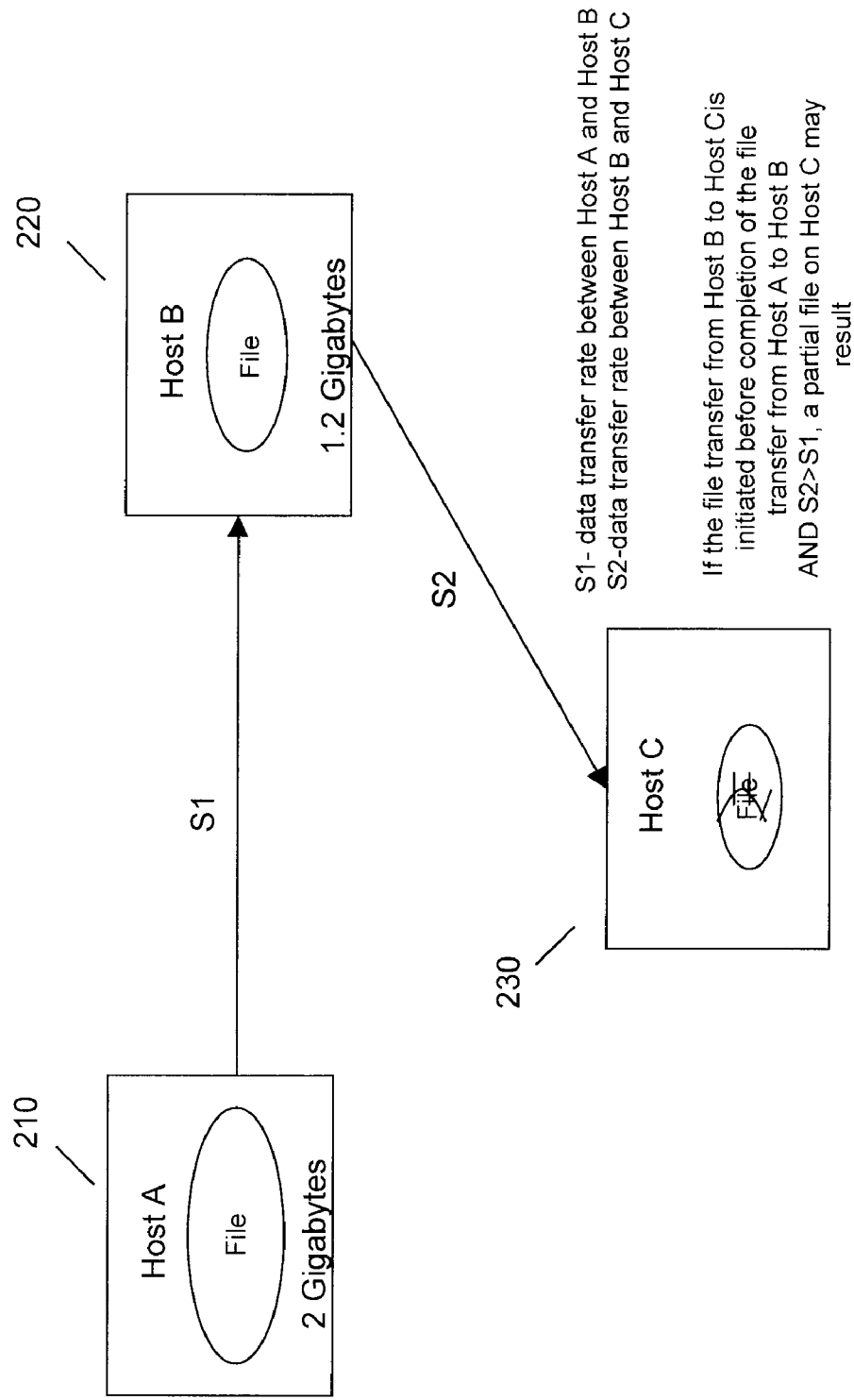
FIG. 2 illustrates a file transfer problem between three devices.

Referring to FIG. 2, a file transfer problem associated with convention arrangements is illustrated. Currently, if a file transfer is initiated from Host B 220 to Host C 230 before completion of the file transfer S1 from Host A 210 to Host B 220, depending on the implementation, either the file transfer operation S2 will fail or will result in a partial file, if transfer from Host B 220 to Host C 230 completes before transfer from Host A 210 to Host B 220.

Accordingly, embodiments of the invention are configured to solve this problem. Embodiments of the invention ensure that copy from Host B 220 to Host C 230 is not completed (and the S2 connection is closed) until the file is completely copied from Host A 210 to Host B 220. One configuration, consistent with the embodiments of the invention, capable of achieving this is a configuration enhancing the file system and server. The file system and the server (transferring the file to Host C in this example) are configured to recognize that this file has been opened in append mode for downloading/copying the file from some other location (not any random write mode). Accordingly, the copy/file transfer session between Host B 220 and Host C 230 is kept open until the file is closed and ensures a complete file has been transferred to Host C 230.

In this exemplary scenario according to embodiments of the invention, Host A 210 has the file that Host B 220 and Host C 230 need, and Host A 210 is also the server for Host B. Host B 220 is a client with regard to Host A 210, and Host B 210 is a server with regards to Host C. Host C 230 is a client with regard to Host B 220. Also Host B 220 could be the same as Host C 230, such as in the case where a local copy (of the file being copied from Host A 210) is being done.

In a scenario attempting a simultaneous file transfer triggered from Host A 210 to Host B 220 and from Host B 220 to Host C 230, differences in file transfer rate can prove problematic. As can be appreciated, in a file transfer configuration described above (FIG. 2), a speed up of the file transfer from Host A 210 to Host B 220, such that a transfer is slower than from Host B 220 to Host C 230, will result in partial file being copied onto Host C. Experiments have verified this kind of file copying problem using file transfer protocol (FTP) file transfer (as well as "CP" command when Host B 220 is same as Host C 230), that is this results in partial file copied onto Host C 230.

Accordingly, embodiments of the invention provide a solution to such file transfer problems. A solution consistent with embodiments of the invention is to keep the connection between Host B 220 and Host C 230 alive (open) until Host B 220 has the complete file transferred from Host A 210.

Figure 3:
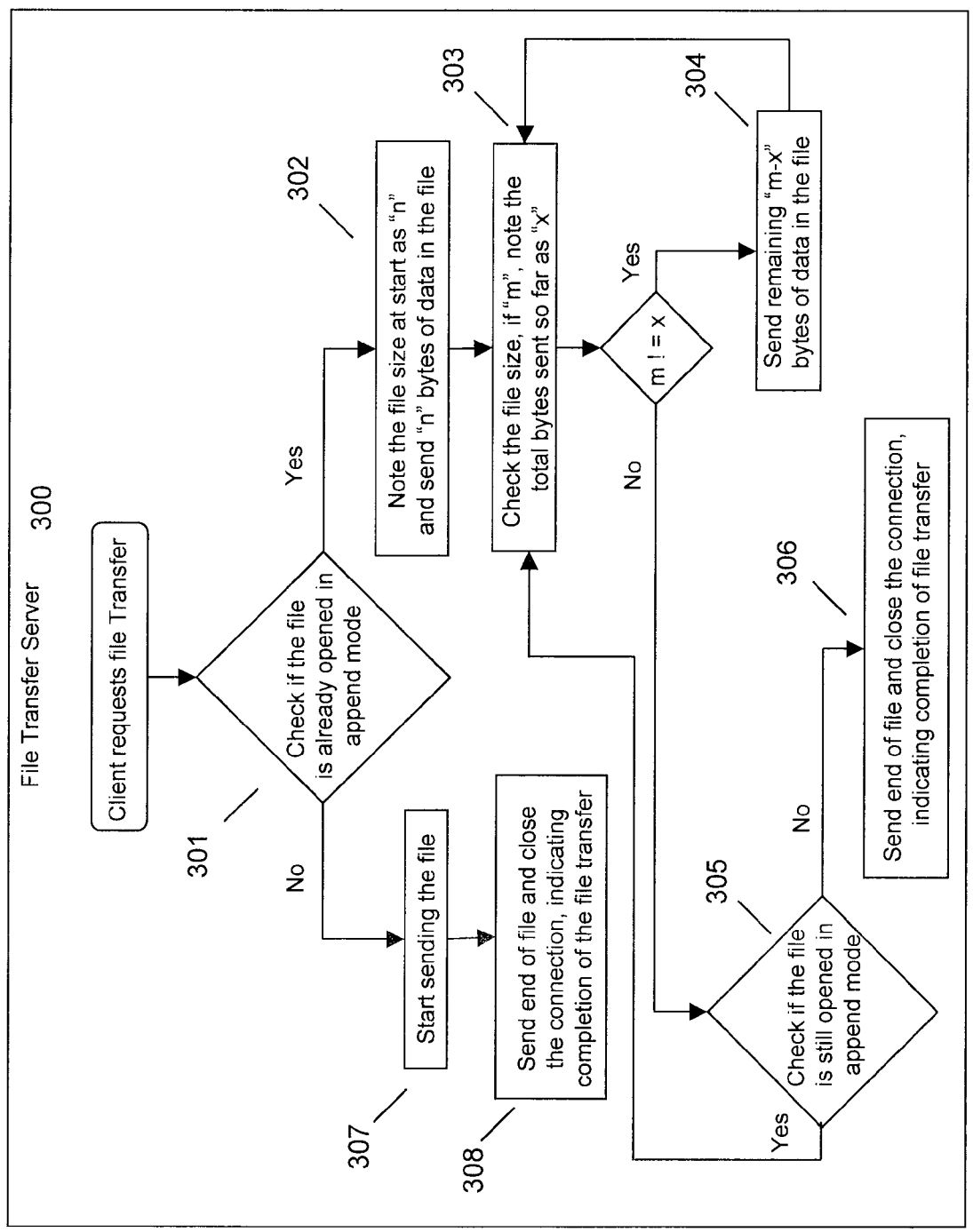
FIG. 3 illustrates a file transfer solution between three devices according to an embodiment.

FIG. 3 illustrates an exemplary file transfer server according to embodiments of the invention. (Hosts A, B and C of FIG. 2 are utilized in this non-limiting example). As shown, embodiments of the invention are configured to achieve this by introducing a check in the file transfer server 300 (for example, Host B 220 of FIG. 2) to check if the file that is being transferred has been created in an "Append Mode" (for downloading/copying the file from some other location) at 301, rather than some arbitrary "Read/Write Mode".

If, yes, then at 302 the file size is noted at the start of the transfer (to Host C 230) as "n" and the "n" bytes of data available are sent to the other device (Host C 230). Subsequently, at 303 a check of the file size is made. If the file size has increased, that is to "m", then the total bytes sent so far is noted, for example as "x".

Next, at 304 a check is made to determine if "m" !="x" ("m" does not equal "x"). If yes, the remaining "m-x" bytes of data are sent, at which point the process cycles back to 303. If no, at 305 a check is made to determine if the file is still opened in the append mode. If not, at 306 the end of the file is sent and the connection is closed, indicating the completion of the file transfer. If still opened in append mode, the process cycles back to 303 for another check of the file size and subsequent processing, as described above.

If the initial check at 301 indicates that the file is not already opened in append mode, sending of the file can start at 307 and will continue until the end of the file is sent at 308 and the connection is closed, indicating completion of the file transfer. Thus, embodiments of the invention configure the file transfer server 300 to keep the connection with Host C 210 alive while transferring in parallel whatever packets of the file it receives from Host A 210 until the whole file is transferred.

Those having ordinary skill in the art will appreciate that while time is one of the biggest motivators for having this sort of a feature, what this feature also helps to achieve is automation of parallel distribution of files across multiple networks. For example, without this feature, a script cannot be written that simultaneously starts download from Host A to Host B and from Host B to Host C and leaves these transfers running at after office hours. Thus, without employing an embodiment of the invention, one would have to wait for the transfer from Host A to Host B to be completed, and, subject to the size of the files being transferred, the Host B to Host C transfer will always break.

Moreover the current data sizes that are being transferred across are a serious challenge to any downloads, for example 64 bit systems have their JAVA® heaps configured to a few hundred Gigabytes, which makes the entire process and memory footprints even larger. This imposes a serious challenge to faster download mechanisms. It will also be appreciated by those having skill in the art that there is a definite business advantage and incentive for large corporations to implement this as a part of their file transfer/Operating system offerings. Accordingly, embodiments of the invention resolve these difficulties.

In short, embodiments of the invention provide a solution that is simple to implement and has plenty of practical applications in real world scenarios, for example FTP is still the biggest client for file transfers across multiple networks and platforms and is available by default.

It should be noted as well that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   one or more processors; and
   a computer readable storage medium having computer readable code embodied therewith and executable by the one or more processors, the computer readable program code comprising:
      computer readable program code configured to receive one or more file transfer requests for one or more files;
      computer readable program code configured to check the one or more files corresponding to the one or more file transfer requests to determine if the one or more files are opened in an append mode;
      computer readable program code configured to start one or more file transferring sessions for the one or more files; and
      computer readable program code configured to ensure that the one or more file transferring sessions remain open until the one or more files are no longer opened in the append mode.

2. The apparatus according to claim 1, wherein the computer readable program code further comprises:
   computer readable program code configured to note one or more sizes of the one or more files responsive to a determination that the one or more files is opened in the append mode.

3. The apparatus according to claim 2, wherein the computer readable program code further comprises:
   computer readable program code configured to check one or more sizes of the one or more files subsequent to said note of the one or more sizes of the one or more files.

4. The apparatus according to claim 3, wherein the computer readable program code further comprises:
   computer readable program configured to transfer one or more additional portions of the one or more files responsive to a determination that one or more additional portions of the one or more file have been received subsequent to the start of said one or more file transfers.

5. The apparatus according to claim 3, wherein the computer readable program code further comprises:
   computer readable program code configured to continue the one or more file transferring sessions while repeatedly checking the one or more sizes of the one or more files;
   wherein the one or more file transferring sessions remain open for-a file to be transferred until said file to be transferred is determined not to be in append mode.

6. The apparatus according to claim 1, wherein if the one or more files is not opened in the append mode, the one or more file transferring sessions immediately start and the apparatus proceeds to completely transfer said one or more files.

7. The apparatus according to claim 1, wherein the one or more file transfer requests are issued from one or more client devices.

8. The apparatus according to claim 7, wherein the one or more files corresponding to the one or more file transfer requests comprise one or more files currently being downloaded from one or more servers.

9. The apparatus according to claim 1, wherein the apparatus comprises a file transfer server operating under file transfer protocol.

10. A method comprising:
    receiving one or more file transfer requests for one or more files;
    checking the one or more files corresponding to the one or more file transfer requests to determine if the one or more files are opened in an append mode;
    starting one or more file transferring sessions for the one or more files; and
    ensuring that the one or more file transferring sessions remain open until the one or more files are no longer opened in the append mode.

11. The method according to claim 10, further comprising: noting one or more sizes of the one or more files responsive to a determination that the one or more files is opened in the append mode.

12. The method according to claim 11, further comprising:
    checking one or more sizes of the one or more files subsequent to said note of the one or more sizes of the one or more files.

13. The method according to claim 12, further comprising:
    transferring one or more additional portions of the one or more files responsive to a determination that one or more additional portions of the one or more file have been received subsequent to the start of said one or more file transfers.

14. The method according to claim 13, further comprising:
    continuing the one or more file transferring sessions while repeatedly checking one or more sizes of the one or more files;
    wherein the one or more file transferring sessions remain open for a file to be transferred until said file to be transferred is determined not to be in append mode.

15. The method according to claim 10, wherein if the one or more files is not opened in the append mode, the one or more file transferring sessions immediately start and proceed to completely transfer of said one or more files.

16. The method according to claim 10, wherein the one or more file transfer requests are issued from one or more client devices.

17. The method according to claim 10, wherein the one or more files corresponding to the one or more file transfer requests comprise one or more files currently being downloaded from one or more servers.

18. The method according to claim 10, wherein said checking, starting and ensuring steps are performed on a file transfer server operating under file transfer protocol.

19. A computer program product comprising:
- a computer readable storage medium having computer readable program code embodied therewith, the computer readable program code comprising:
  - computer readable program code configured to receive one or more file transfer requests for one or more files;
  - computer readable program code configured to check the one or more files corresponding to the one or more file transfer requests to determine if the one or more files are opened in an append mode;
  - computer readable program code configured to start one or more file transferring sessions for the one or more files; and
  - computer readable program code configured to ensure that the one or more file transferring sessions remain open until the one or more files are no longer opened in the append mode.

20. The computer program product according to claim 19, wherein the one or more files corresponding to the one or more file transfer requests comprise one or more files currently being downloaded from one or more servers.

* * * * *